(12) United States Patent
Steinle et al.

(10) Patent No.: US 8,938,471 B2
(45) Date of Patent: Jan. 20, 2015

(54) METHOD FOR SETTING UP AN ARRAY OF TECHNICAL UNITS

(75) Inventors: Claus Steinle, Stuttgart (DE); Christiane Engel-Winter, Schwieberdingen (DE); Joachim Breithaupt, Schwieberdingen (DE); Herbert Leuwer, Backnang (DE); Gunnar Piel, Hemmingen (DE); Andreas Brune, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 164 days.

(21) Appl. No.: 13/540,848

(22) Filed: Jul. 3, 2012

(65) Prior Publication Data

US 2013/0013632 A1 Jan. 10, 2013

(30) Foreign Application Priority Data

Jul. 5, 2011 (DE) .......................... 10 2011 078 630

(51) Int. Cl.
*G06F 17/30* (2006.01)
*G06F 9/48* (2006.01)
*G06F 9/50* (2006.01)

(52) U.S. Cl.
CPC .................................. *G06F 9/5011* (2013.01)
USPC ......................................... 707/769; 718/100

(58) Field of Classification Search
USPC ................... 718/102, 106, 100, 104; 707/769
See application file for complete search history.

(56) References Cited

U.S. PATENT DOCUMENTS

| 6,754,736 | B1 * | 6/2004 | Ogawa et al. | 710/39 |
| 6,823,472 | B1 * | 11/2004 | DeKoning et al. | 714/10 |
| 7,100,161 | B2 * | 8/2006 | Latour | 718/102 |
| 8,220,004 | B2 * | 7/2012 | Manttari et al. | 719/312 |
| 8,627,331 | B1 * | 1/2014 | Grunwald et al. | 718/106 |
| 2008/0010643 | A1 * | 1/2008 | Oohira et al. | 718/102 |

FOREIGN PATENT DOCUMENTS

EP 1 199 632 4/2002

* cited by examiner

*Primary Examiner* — Hung T Vy
(74) *Attorney, Agent, or Firm* — Kenyon & Kenyon LLP

(57) ABSTRACT

A method for setting up an array of technical units and such an array are presented. The method is used for the independent setup and operation of an array of technical units, the technical units being connected to one another via a system communication bus, a query for a system resource being transmitted from a querying unit to all other units, all other units checking whether the resource has already been assigned to this unit itself, and all querying units transmitting an appropriate response to the querying units and the system resource being assigned thereto if it is not already assigned to one of the other units.

5 Claims, 4 Drawing Sheets

METHOD FOR SETTING UP AN ARRAY OF TECHNICAL UNITS

RELATED APPLICATION INFORMATION

The present application claims priority to and the benefit of German patent application no. 10 2011 078 630.9, which was filed in Germany on Jul. 5, 2011, the disclosure of which is incorporated herein by reference.

FIELD OF THE INVENTION

The present invention relates to a method for setting up an array of technical units, in particular of electrical and/or electronic units, which, when they are set up, form a system. Furthermore, the present invention relates to such an array.

BACKGROUND INFORMATION

Technical units are to be understood as technical devices which are used, for example, for controlling and/or regulating technical sequences or for implementing technical functions. To implement complex functions and functionalities, individual devices or units are combined to form a system, for example, a stacked system or rack system. A system is to be understood as an array or a formation and therefore a totality of elements which are related to one another and interact in such a way that they form a unit for a specific task, meaning, or purpose and are delimited in relation to the surroundings in this regard.

Such combined systems typically require a control and administration authority. Currently, the control and administration functionality is provided within the system in a control and administration device provided for this purpose, which is exclusively provided for this purpose in many cases.

Such a fixed assignment of the control and administration tasks to a device has the disadvantage that this device, which must be provided, generally does not contribute to the functionality of the overall system. Rather, this device must also be supplied with power, generates additional heat, and requires space.

The publication EP 1 199 632 A1 discusses a method and a unit for balancing over time an access to a resource. Multiple threads are executed in a computer environment. In addition, multiple mutexes are provided, only one thread being assigned to a mutex. A control program is executed within the scope of the method in such a way that a mutex is assigned to the thread which requests an access to the resources.

SUMMARY OF THE INVENTION

Against this background, a method and an array having the features described herein are presented. Embodiments result from the further descriptions herein.

According to the presented method, there is no permanently assigned unit which fulfills control and administration tasks. This unit is replaced in that a dynamic allocation of the required control and administration functions is carried out, specifically an allocation of the system resources and functions to the units provided in the array.

During the setup of the system, required control and administration functions (system functions) are executed by some or even all provided units. These units compete for the system functions of the overall system. This means that the system functions are dynamically assigned to the units. The described method ensures that only one of the units receives the execution right for a specific system function. This unit may relinquish the right again. In the case of a malfunction, other units may in turn obtain the execution right.

An important component is the so-called system mutex (mutual exclusion). This is available for all units and is independent of an operating system. A unit which receives the system mutex obtains the execution right to execute the control and administration functions connected thereto. This means that a system mutex is assigned to any system function which is to be assigned. The unit which receives the system mutex may execute the system function.

To implement the system mutex, all devices must be connected via the system management bus or communication bus. This bus must provide a multi-master functionality. This means that multiple units compete for the communication medium and one prevails.

The physical mutex memory only still exists where the mutex was allocated. This has the advantage that the invalidation occurs quasi-automatically in case of error. All units are connected to a system communication bus. This system communication bus has a so-called multi-master functionality, using which it is possible to regulate an assignment of the mutex for all units. In this way, functions of the system may be allocated to all units.

Further advantages and embodiments of the present invention result from the description and the appended drawings.

It is understood that the above-mentioned features and the features to be explained hereafter are usable not only in the particular specified combination, but rather also in other combinations or alone, without departing from the scope of the exemplary embodiments and/or exemplary methods of the present invention.

DETAILED DESCRIPTION

Figure 1:
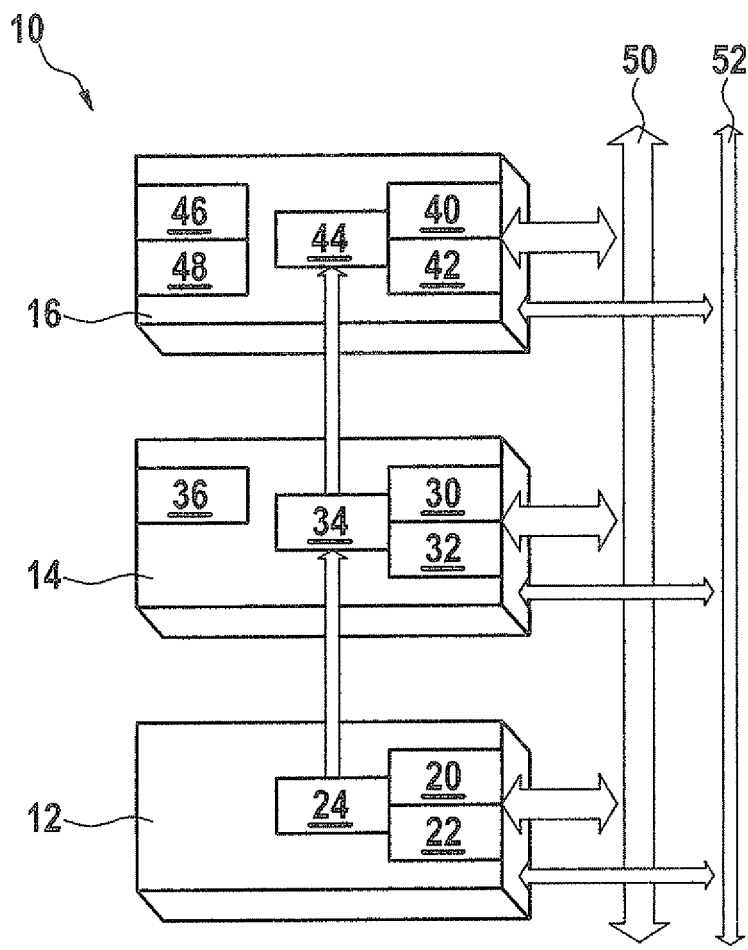
FIG. 1 shows a specific embodiment of the presented array.

The exemplary embodiments and/or exemplary methods of the present invention are schematically shown on the basis of specific embodiments in the drawings and will be described in greater detail hereafter with reference to the drawings.

FIG. 1 shows an embodiment of a stackable array, identified as a whole by reference numeral 10. This array 10 includes a first technical unit 12, a second unit 14, and a third unit 16. Technical units 12, 14, 16 of array 10 form a stackable system or a rack system.

First unit 12, which is also referred to as a base or bottom unit, has a system communication bus master 20 and a system communication bus slave 22, as well as an address 24, which is obtained by enumeration. Second unit 14 accordingly has a system communication bus master 30, a system communication bus slave 32, and an address 34 of second unit 14. Furthermore, a system function z 36 is provided. Third unit 16, which may be referred to as the upper unit or top unit, has a system communication bus master 40, a system communication bus slave 42, and an address 44. Furthermore, a system function x 46 and a system function y 48 are provided.

Units 12, 14, 16 are connected via system communication bus 50 to a data line 52, on which information about a failure of one of units 12, 14, 16 and therefore a failure of array 10 or of the system formed by array 10 is transmitted.

Illustrated array 10 or the system has been developed for hardware units, in this case units 12, 14, and 16. These units 12, 14, and 16 may operate alone or within array 10. By combining units 12, 14, 16 in the system, the demand increases for administering the behavior of the system. Since a dedicated system controller is not provided, units 12, 14, 16 must cover the system functions themselves. Therefore, units 12, 14, 16 attempt to locally set up a system functionality. In order to ensure that a specific system function does not run on multiple units 12, 14, 16, each system function is protected by a system mutex. When this mutex is operated within the system, units 12, 14, 16 must jointly use system-relevant information. The medium for exchanging information is system communication bus 50.

In the embodiment shown, system communication bus 50 uses a suitable communication scheme. Each communication unit or unit 12, 14, 16 requires a unique address. Addresses 24, 34, 44 are obtained in the system by the hardware enumeration. This enumeration function provides a unique number or a unique address to each unit 12, 14, 16 within array 10. This is initiated at the bottom by first unit 12 and continued, unit by unit, until it ends at uppermost unit 16. This process is cyclically repeated to cover changes which may result during the runtime of array 10. The presented method may therefore be carried out to initialize and/or operate array 10.

Fundamentally, employed system communication bus 50 should have the following properties:

Multi-Master Capability

Each unit in the system may be the bus master. The access to the bus is regulated by an arbitration phase, which is "won" by a master. All other masters behave as slaves from this point, until the one master releases the bus again.

Synchronization

In order for the arbitration to function reliably at every point in time, the masters, which simultaneously operate as clock generators, must synchronize their clock pulses among each other. The resulting clock pulse is determined by the slowest master. Frequency and pulse-pause ratio of the clock pulse may change with each clock cycle.

Atomic Sequence

The master which has the bus must be able to execute the following sequence atomically: synchronous or simultaneous reading of an item of information from all other users, the information having either a recessive or dominant status. Each user provides its local status of the information simultaneously on the bus. A dominant status overwrites the recessive status. The master evaluates the status of the information on the bus, initiates appropriate local actions, and renews its local statuses accordingly. Only then does it release the bus again. The information corresponds to a system mutex having the statuses "available" or "occupied." Occupied is the dominant status. The system function is locally started when the recessive state "available" is read on the bus. The local status of the system mutex is set to "occupied."

Each unit 12, 14, 16 must have a bus slave 22, 32, 42 to receive and/or provide system information. To actively query or provide system information, an additional optional bus master 20, 30, 40 is necessary. In each of units 12, 14, 16, master 20, 30, and 40 and slave 22, 32, and 42, respectively, use the same addresses 24, 34, 44.

The communication mechanisms of system communication bus 50 include unicast and broadcast mechanisms. Each of the following accesses is an atomic procedure of the system.

|  | Broadcast | Unicast | Atomic Access |
|---|---|---|---|
| Reading | Not Assisted | 1 Master from 1 Slave | Yes |
| Writing | 1 Master to All Slaves | 1 Master to 1 Slave | Yes |
| System Mutex Assignment | 1 Master to All Slaves - All Slaves to 1 Master | Not Assisted | Yes |

A mutex assignment in the broadcast mode is a special mechanism to provide a mutex functionality to the system. A unit 12, 14, 16, which outputs the atomic process, calls up an access or a query and is therefore capable of carrying out an atomic read-modifier-write access on a system-wide mutex.

Units having a dedicated functionality may also be provided, which are used for the purpose of perceiving additional, dynamically distributed system tasks.

Figure 2:
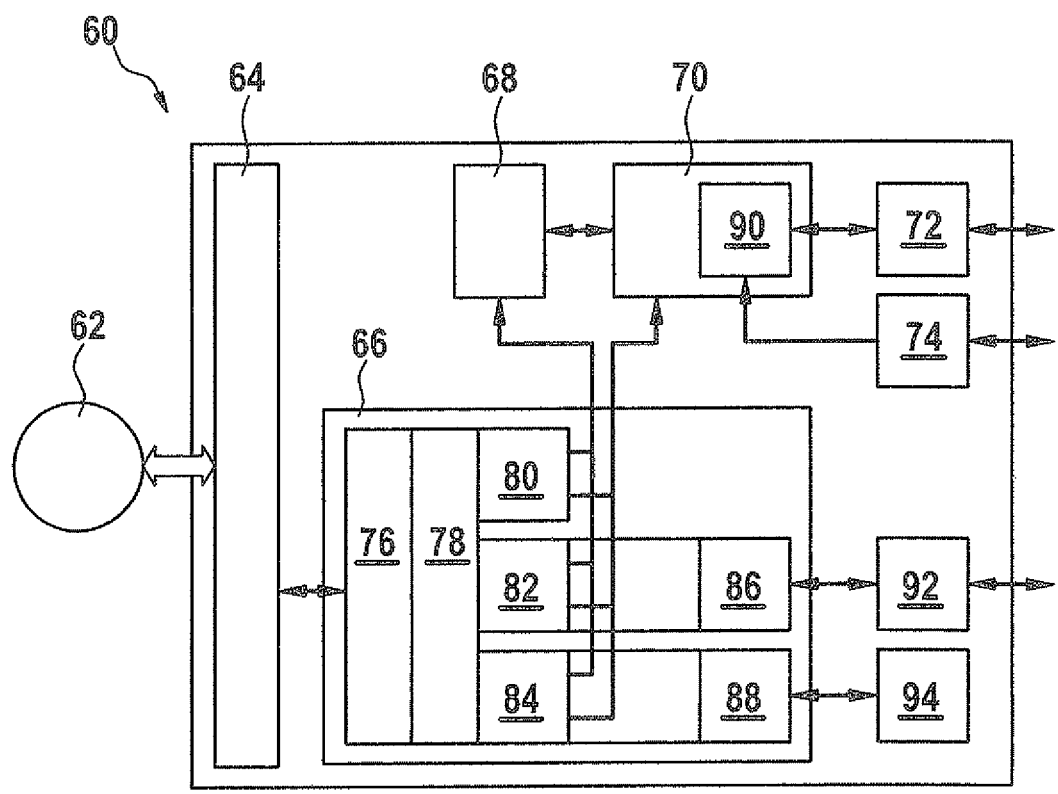
FIG. 2 shows the system functionality.

FIG. 2 shows, to illustrate the system functionality, the possible configuration of a unit which is identified as a whole by reference numeral 60. This unit 60 is connected to an external client 62 for system functions. The illustration shows an interface 64 for a network access, a system function frame 66, a mutex server 68, a system bus resource manager 70, a bus master and slave module 72, and a hardware enumerator 74. A first function 76 for a network access, a second function 78 for the system function protocol, a first system function 80, a second system function 82, a third system function 84, a third function 86 for a hardware access, and a fourth function 88 for a hardware access are provided in system function frame 66. Furthermore, the illustration shows a first optional hardware unit 92 and a second optional hardware unit 94.

The system communication carried out is handled in each unit 60 by resource manager 70, in which a function 90 for a hardware access is provided. Resource manager 70 ensures the access to the system communication bus for an individual internal client at a determined point in time. The other clients are queued.

Mutex server 68 is such an internal client; there may be additional clients. Resource manager 70 uses parts of the system communication bus protocol.

The system communication bus of the system uses a multi-master-multi-slave communication. Each unit includes a bus slave and a bus master. The master may be omitted if the unit never initiates a data exchange. The master and the slave of a unit use the same address. Each address of the unit corresponds to the unit count which was obtained during the hardware enumeration.

The data exchange on the system communication bus may take place as a broadcast or unicast communication. In the case of the broadcast mode, the general broadcast address is used. In the case of a unicast, the address of the slave to be contacted is used. Since the system communication bus represents a multi-master system, it is necessary to record the address of the initiator of the transmission in each message to ensure the arbitration in the bus.

The communication of the system communication bus is only permitted when all units have been enumerated. This is indicated by a specific system administration bus message, which is transmitted by the uppermost unit as soon as the enumeration has been successfully carried out. This status "enumeration performed" is received by every unit and stored therein. This information loses its validity after a certain time and must be renewed at regular intervals. Since the hardware enumeration is carried out cyclically, the mentioned status is also distributed cyclically.

The unicast communication should not take place before the status "device up" of the slave to be addressed (device operationally ready) is set within the initiating unit. Therefore, each unit which uses the unicast operation is to monitor the "device up" broadcast messages of the units which it plans to contact. This status also represents information which becomes invalid after a certain time, and should therefore be renewed at regular intervals.

It is to be noted that there is only one authority in a unit which is capable of requesting or understanding information via the system communication bus. Furthermore, it must be capable of evaluating this information and initiating appropriate actions. The information corresponds to the status of a system mutex and the action of a system function. This authority is typically software. However, solely hardware authorities are also conceivable.

An overview of possible system communication bus messages is provided in the following table:

| Message | Message Type | Transmission Initiator | Data Receiver | Transmission Condition |
|---|---|---|---|---|
| Enumeration performed | Broadcast | Top unit | All units | Every time when hardware enumeration successfully reaches upper unit |
| Device up | Broadcast | Each unit | All units | Cyclically, while enumeration is being carried out and unit is capable of participating in communication and carrying out system function |
| System mutex query | Broadcast | Each unit | All units | When enumeration has taken place and mutex server queries any system mutex |

In order to assign and use any resource which may be used jointly by units, the assigned system mutex must first be assigned. A system resource may be the authority of a certain system function or a jointly used hardware feature, for example, trigger channels. A separate system mutex is assigned to each system resource. A system mutex is defined by a unique mutex ID and a Boolean locking state.

There is only one mutex server in each unit. Only one query is processed at each point in time. Others are queued. All mutex servers in a system arbitrate the assignment of a certain mutex among each other. An arbitration is carried out via the message "mutex access." In this message, the querying unit transmits the mutex ID to that which requests it in order to communicate this to all units. Each unit checks whether it has already assigned this mutex in its mutex server and responds with a local system mutex occupancy or locking status. "System mutex occupied" is equivalent to a dominant bit in the bus response, while "system mutex free" is recessive. When a unit has locked the system mutex, its dominant response will overwrite the simultaneously or synchronously transmitted recessive responses of the other units.

The querying unit will then establish that the system mutex is already occupied and therefore the system resources are not available. For the case in which the response is recessive, the system mutex is free. The querying unit will then update this system mutex occupancy status to "system mutex occupied" in its mutex server and finally terminate the bus transmission and release the bus. "System mutex occupied" is only stored in the mutex server of the mutex owner. An access to a system mutex is an atomic operation in firmware and on the system communication bus. A mutex access may only be terminated on the bus when the system mutex occupancy status has been updated based on the result of the mutex access. After a reset of the unit, the status is "mutex free."

Figure 3:
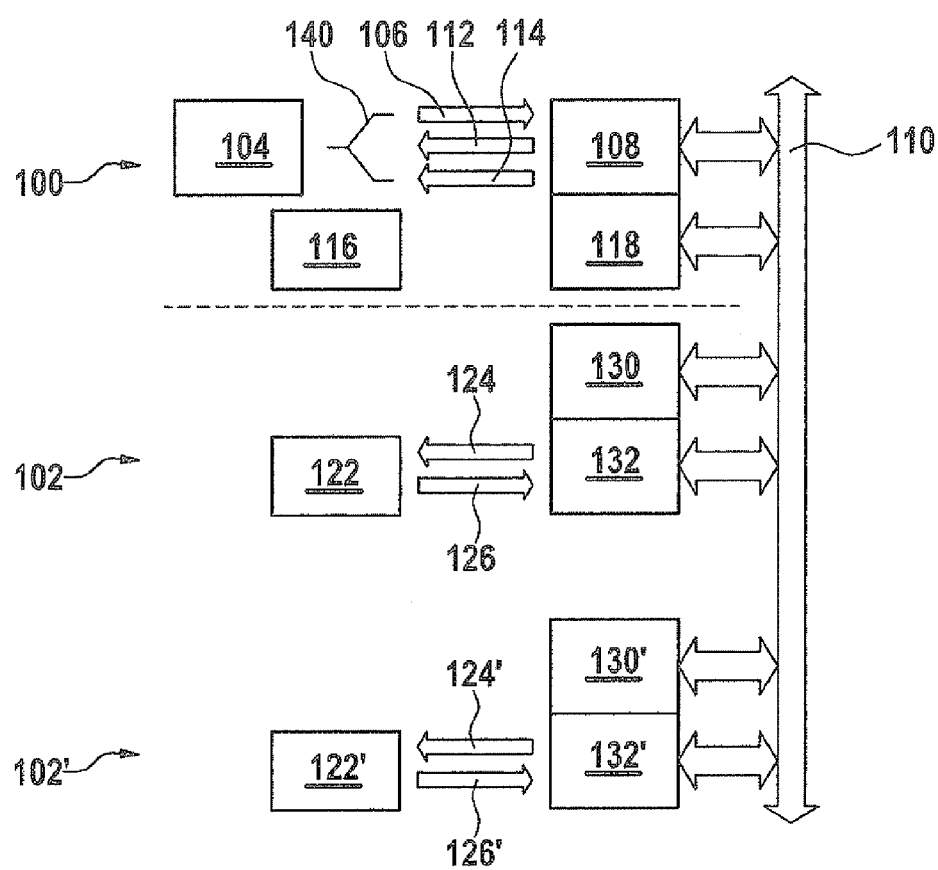
FIG. 3 shows the assignment of the system mutex.

FIG. 3 shows the assignment of a system mutex. An nth unit 100 and a kth unit 102 are shown. A mutex query is made by a system function in a first step 104, as soon as the enumeration has taken place. This represents an atomic operation. A query for mutex n (arrow 106) is made at a bus master 108, which is connected to a system communication bus 110. This corresponds to arrow 121 and arrow 124. A report mutex n is returned by bus master 108 (arrow 112) and an assignment that mutex n is free takes place (arrow 114). The illustration also shows a bus slave 118.

Furthermore, a further unit 102' is illustrated, whose behavior corresponds to that of unit 102.

In kth unit 102 and further unit 102', in the event of a query for mutex n (arrows 124 and 124'), a memory unit 122 and memory unit 122' are read out for mutex n and the stored value (arrows 126 and 126') is output via system communication bus slave 132 and 132'. Responses 126 and 126' are transmitted simultaneously or synchronously via system communication bus 110. A system communication bus master 130 or 130' of kth unit 102 or further unit 102' is not involved.

The query identified by arrow 106 therefore corresponds to the input (arrows 124 and 124') at kth unit 102 or further unit 102'. The reaction thereto, the output (arrows 126 and 126') of kth unit 102 or 102', causes the input (arrow 112) at nth unit 100. An atomic access is enclosed by a polygonal bracket 140.

Arrow 114 represents the output for the case in which no dominant response exists, the mutex is free and is allocated. The allocation is noted in a storage unit 116.

A system function should be configured in such a way that a portability of various types of operating systems and hardware platforms is ensured. Operating system mechanisms and hardware accesses must therefore be separated from the logical functionality. Each system function is represented as a function library. A system function library only contains the logical parts of the system function. This is independent of the target and operating system. Each hardware feature is shifted to a specific target library. An external communication with system functions is made possible by a medium-specific interface function library. All system functions, interface libraries, and target-specific function libraries run within the system function frame, which operates in a system-specific way.

The activation of each system function is protected by a dedicated system mutex. The system function may only operate when the assigned system mutex has been successfully occupied or blocked.

An activation of the system functions in a unit may occur, for example, in the case of startup, reset, and release of a system error signal. An activation may occur in units of high performance. This may be achieved by a delay time, which is a function of the performance of the unit, after the conditions for the activation (system error signal reset and enumeration of the units performed) have been met, high performance units having the shortest reaction or delay time. After the delay, the system function framework attempts to occupy the system mutexes for its available functions. The particular system function is then activated for each successfully occupied system mutex.

The system error signal is a hardware signal used system wide. It is set by any unit when it is reset, upon shutdown, if it was not enumerated, or if the unit is not capable of executing its system functions. It is a wired OR signal and is not reset before it has reset each unit.

The use of the system error signal for an activation of the system function ensures that a renewed activation of the system functions takes place if one unit is faulty. The specific delay time runs again in each unit when the system error signal has been reset and the enumeration (corresponds to address assignment on the system communication bus) has taken place. Each unit then attempts again to occupy the system mutexes for the not yet activated system functions. Units which were not influenced by the error maintain their already activated system functions. System functions which run on the faulty unit may either be activated again on the same unit or other units may take them over, if the faulty unit operates again or was removed from the system.

Figure 4:
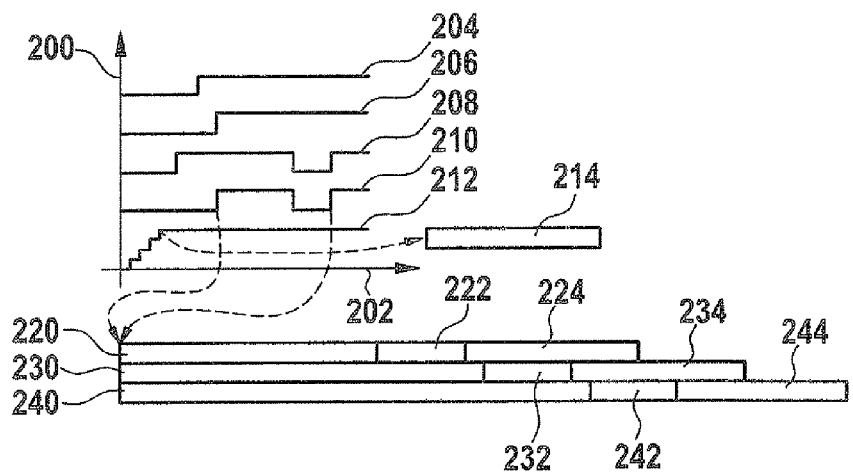
FIG. 4 shows the assignment of a system function.

A graph of the sequence during an activation of a system function is reproduced in FIG. 4. Signal curves are plotted on an ordinate 200 over the time on an abscissa 202. A first curve 204 shows a system error of a unit x. A second curve 206 shows a system error of a unit y. A third curve 208 shows an error of a unit z. A fourth curve 210 is the OR linkage of the first three curves 204, 206, 208 and indicates a system error. A fifth curve 212 indicates the value of the signal "enumeration performed." The message "enumeration performed" therefore occurs at a point in time 214.

For unit x: A first period of time 220 indicates a delay, which is a function of the performance of unit x. In a second period of time 222, the query for the system mutex is made. In a third period of time 224, the instantiation of the system functions takes place.

For unit y: A first period of time 230 indicates a delay, which is a function of the performance of unit y. In a second period of time 232, the query for the system mutex is made. In a third period of time 234, the instantiation of the system functions takes place.

For unit z: A first period of time 240 indicates a delay, which is a function of the performance of unit z. In a second period of time 242, the query for the system mutex is made. In a third period of time 244, the instantiation of the system functions takes place.

What is claimed is:

1. A method for providing an independent setup of an array of at least three technical units, which are connected to one another via a system communication bus, the method comprising:

transmitting a query for a system resource from a first technical unit to at least two other technical units of the array, wherein each of the at least three technical units is configured to selectively perform a system function, the system function being performed by one of the at least three technical units only if the one of the at least three technical units is assigned the system resource;

checking by the first technical unit, with each of the at least two other technical units, whether the system resource has already been assigned to one of the at least two other technical units;

transmitting, from each of the at least two other technical units, a corresponding response to the first technical unit; and assigning the system resource to the first technical unit if the system resource is not already assigned to the one of the at least two other technical units.

2. The method of claim 1, wherein a system mutex is assigned to each system resource and the first technical unit names this system mutex in the event of the query for a system resource.

3. The method of claim 1, wherein if the one of the at least two other technical units is assigned the system resource, the one of the at least two other technical units which is assigned the system resource provides a dominant response on the system communication bus, and if at least one of the at least two other units is not assigned the system resource, the at least one of the at least two other units which is not assigned the system resource provides a recessive response on the system communication bus.

4. The method of claim 1, wherein the method is carried out to initialize the array.

5. The method of claim 1, wherein the method is carried out to operate the array.

* * * * *